Figure 1:
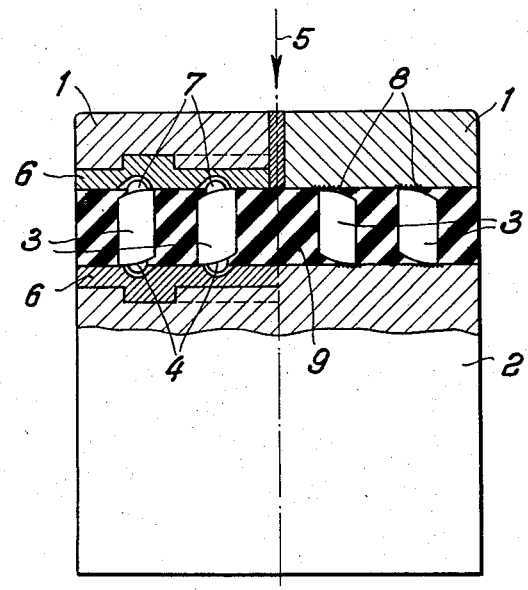

Jan. 6, 1959  W. ECKOLD  2,867,141
APPARATUS FOR DEFORMING SHEETS OR PROFILES
Filed May 12, 1954  2 Sheets-Sheet 2

Inventor:
Walter Eckold
By Young, Emery & Thompson
attys.

United States Patent Office 2,867,141
Patented Jan. 6, 1959

2,867,141

APPARATUS FOR DEFORMING SHEETS OR PROFILES

Walter Eckold, St. Andreasberg, Sperrluttertal (Oberharz), Germany

Application May 12, 1954, Serial No. 452,196

Claims priority, application Switzerland May 15, 1953

5 Claims. (Cl. 78—61)

This invention relates to apparatus for deforming, especially for upsetting and/or stretching, sheets or profiles, consisting of an upper part and a lower part, each part having one or more pairs of jaws arranged on a carrying body or frame, there being inserted between the jaws and the carrying body, support members which effect the mutual working movements of the jaws, when a pressure is applied to the jaws in a direction substantially perpendicular to their direction of movement and effect the return movement of the jaws when the pressure is removed.

In such apparatus for the deformation of material it is known to make the jaws as wedge jaws, and to have their wedge surfaces slide upon corresponding inclined faces formed or mounted on the carrying body. The sliding friction then occurring, and the lubrication necessary to overcome it, set a low limit to the working pressures, that is to say the permissible specific surface pressure, and to the achievable number of working strokes. Materials which are scaled cause the jaws to seize even after the apparatus has operated on them for only a short time. As a result of these defects apparatus has already been developed in which the jaws rest upon support members, such as resilient leaves or pins, which are inserted into slots or bores in the carrying body or the jaws and inclined to the faces in which they are made. A disadvantage of this type of apparatus is that the leaves are distorted when overloaded, and thus become unusable. Furthermore the slots are deformed in time, so that the apparatus will no longer work with the necessary precision. Moreover the leaves or pins act in the slots or bores of the carrying bodies or the jaws, into which they are inserted, as splitting wedges, so that the carrying bodies or jaws often break.

The object of the present invention is to provide apparatus, for deforming sheets or profiles in which the defects obtained with known apparatus are eliminated or reduced.

According to the invention apparatus for deforming, especially for upsetting or stretching, sheets or profiles, comprising an upper part and a lower part each part having one or more pairs of jaws arranged on a carrying body or frame and support members interposed between the jaws and the carrying body or frame which effect the mutual working movements of the jaws, when a pressure is applied to the jaws perpendicular to the direction of mutual movement of the jaws and effect the return movement of the jaws when the pressure is removed, is characterised in that the support members are rolling bodies which are so designed and arranged that the application of the pressure causes the rolling bodies to roll upon the surfaces on the jaws and the carrying body between which they are inserted, and thereby cause the mutual motion of the jaws. Sliding friction between the carrying body and the jaws, which needs special attention or leads to excessive wear of material or to seizing of the surfaces rubbing upon one another does not occur in apparatus according to the invention. Furthermore the support members and the individual jaws and their carrying bodies can be made so stable that the apparatus can be constructed for use with pressures which are as high as is desired, and can accordingly be used for the deformation of thick sheets etc.

The rolling movement of the rolling bodies on applying to the jaws a pressure perpendicular to their direction of movement can be brought about by an appropriate construction and arrangement of the rolling bodies themselves, or by inclined faces or guides on the jaws and/or the carrying body.

Even if the pressure applied to the jaws acts only as a perpendicular pressure component upon the support members, i. e. if the surfaces on the jaws and the carrying body between which the support members are interposed are disposed horizontally and therefore at right angles to the vertical pressure force, the support members must be so constructed and held in their rest or initial positions that they roll constrainedly upon the horizontal surfaces, under the action of the pressure applied to the jaws. In this case the strips may consist, for example, of strips having curved rolling edges, the centres of curvature of each of which lie one on each side of the longitudinal axis of the strip. If spheres, rollers or cylinders are used as rolling bodies, their rolling movement must be controlled for instance by inclined surfaces on the jaws or on the carrying body, or both. In a preferred embodiment recesses, having saw tooth sections, are provided in the surfaces for this purpose, the rolling bodies resting against the inclined faces of the recesses.

The rolling bodies are preferably embedded or vulcanised in rubber in such a mutual position that on application to the jaws of a pressure perpendicular to their direction of movement the rolling bodies cause the mutual working motion of the jaws, and on removal of the pressure the resilience of the rubber causes the mutual return movement of the jaws. The rolling bodies may, in addition or alternatively be held together by cages.

By way of example embodiments of the invention will now be described with reference to the accompanying drawings each of which is a section of the lower part of apparatus according to the invention.

In the example shown in Figure 1 there are inserted between the jaws 1 and the carrying body 2 strips or support members 3 with curved rolling edges 4 the centres of curvature of each of which are disposed one on each side of the longitudinal axis of the strip, so that on the application of pressure in the direction of the arrow 5 the strips or support members 3 roll upon the counter-pressure surfaces of the jaws 1 and of the carrying body 2 to produce an inward, that is to say an upsetting, movement of the jaws 1.

In the left-hand half section of Figure 1 the counter-pressure surfaces of the jaw 1 and of the carrying body 2 are inserted as separate, interchangeable plates 6, and further the strips 3 carry lugs 7, to which there correspond recesses in the plates 6, in order to constrain and guide the rolling bodies during their working and return movements. Clearance between the recesses and the curved surfaces of the strips or support members 3 are provided so that the guidance given to the rolling strips is not affected by the pressure applied in the jaws. In order to ensure with greater certainty that the jaws 1 will be driven toward each other even at high pressures, the rolling edges as shown in the right-hand half of the section may be made slightly grooved or toothed as at 8.

When the pressure becomes effective in the direction of the arrow 5, the rolling bodies or support members 3 roll upon their counter-pressure surfaces and effect the upsetting of the material clamped between the upper part (not shown) of the apparatus and the illustrated lower part.

Since the strips 3 are vulcanised into a layer 9 of rubber, they are automatically returned into their initial position as illustrated, after the perpendicular pressure is removed, and are ready for a new working cycle.

Figure 2:
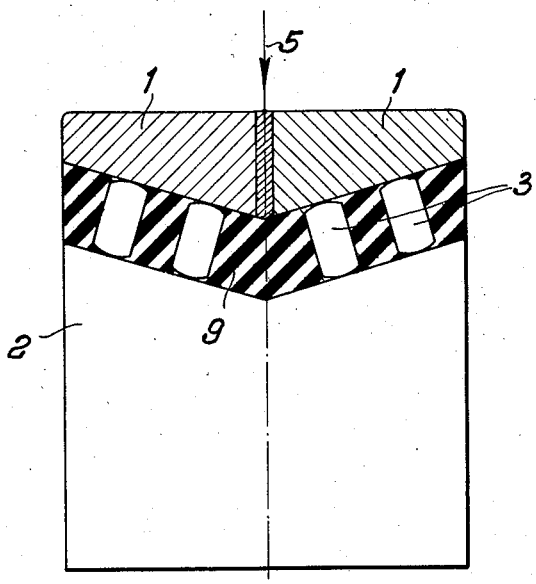

In the example shown in Figure 2, the rolling bodies 3 consist of rounded-off rollers. The jaws 1 are constructed as wedge jaws, the carrying body 2, correspondingly, has inclined counter-pressure surfaces and, the rollers 3 roll, when a pressure is applied in the direction of the arrow 5, upon their counter-pressure surfaces. The return movement of the rollers here again is effected by the rubber layer 9.

Figure 3:
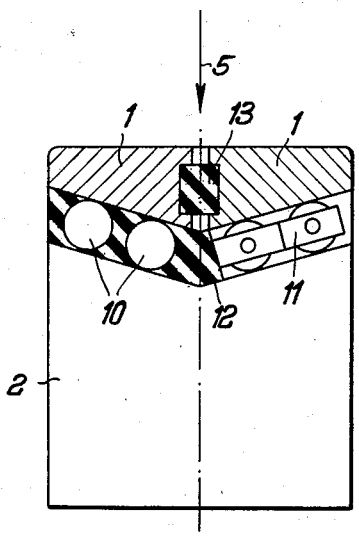

In the embodiment shown in Figure 3 the rollers of Figure 2 are replaced by spheres or rollers 10. Instead of being embedded in rubber the rollers may be held together, as shown in the right-hand half of the drawing, by a special cage 11, which rests against a rubber buffer 12. The return movement of the jaws 1 is aided by the interposed rubber buffers 13.

Figure 4:
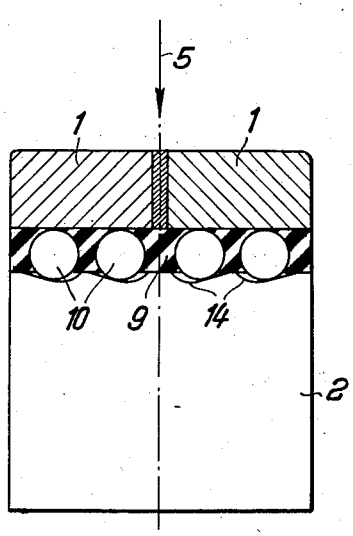

In the embodiment illustrated in Figure 4 the rollers, spheres or cylinders 10, which are again embedded in a layer of rubber 9, roll in depressions 14 in the carrying body 2, on application of pressure in the direction of the arrow 5.

Figure 5:
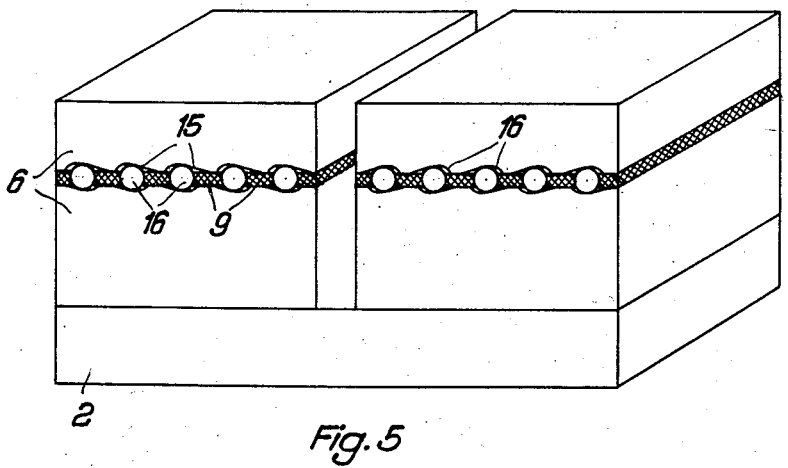

In the embodiment shown in Figure 5 the counter pressure surfaces are formed, as in the construction shown in Figure 1, from separate plates 6, which are secured on the carrying body 2 or on the jaws 1 (not shown). Here the plates 6 now have on each of their facing counter-pressure surfaces recesses 15 such that in section the faces are saw-tooth-like. Rollers 16 are inserted between the inclined faces of the recesses and are embedded in a layer of rubber 9. The recesses 15 are here rounded out at their bottoms 17 in conformity with the curvature of the rollers, and thus form a stop to limit the lateral rolling motion of the rollers.

Apparatus constructed in accordance with the invention may vary in the sizes and designs of the jaws and the carrying bodies thereof, which are determined largely by the dimensions of the workpieces which are to be deformed. Owing to the fact that, for example, the halves of the lower part shown in Figure 5 are arranged at a relatively large distance from one another, it is possible to subject even workpieces with large surface, or strips, to a deforming operation, preferably that of stretching, by means of the apparatus. For such cases it may be expedient to have long clamping strips suitably spaced upon several apparatus arranged one behind the other or one beside the other, in order to avoid the use of a long continuous apparatus.

What I claim is:
1. A tool for deforming sheet metal and profiled elements especially for swaging and drawing, comprising a pair of adjacent jaws to directly contact the sheet metal to be deformed, a carrying body upon which the pair of adjacent jaws are arranged on the carrying body, and a plurality of support members interposed between the jaws and the carrying body to effect the mutual working movements of the jaws when a pressure is applied to the jaws perpendicular to the direction of mutual movement of the jaws and to effect the return movement of the jaws when the pressure is removed, the support members each being in the form of a rolling body with curved contacting surfaces so that upon the application of a force the rolling bodies will be caused to roll upon the jaws and the carrying body between which they are maintained, and thereby cause a relative motion of the two jaws, each rolling body being in the form of a strip with curved rolling ends, the center of curvature of the rolling ends of each strip lying on opposite sides of a longitudinal axis of the strip, so that the strip is caused to roll due to the force transmitted by the horizontally disposed surfaces on the jaws and the carrying body between which surfaces the rolling bodies are provided.

2. A tool for deforming sheet metal and profiled elements especially for swaging and drawing, comprising a pair of adjacent jaws to directly contact the sheet metal to be deformed, a carrying body upon which the pair of adjacent jaws are arranged on the carrying body, a plurality of support members interposed between the jaws and the carrying body to effect the mutual working movements of the jaws when a pressure is applied to the jaws perpendicular to the direction of mutual movement of the jaws and to effect the return movement of the jaws when the pressure is removed, the support members each being in the form of a rolling body with curved contacting surfaces so that upon the application of a force the rolling bodies will be caused to roll upon the jaws and the carrying body between which they are maintained, and thereby cause a relative motion of the two jaws, and a rubber layer provided between the pair of jaws and the carrying body with the rolling bodies embedded in the rubber layer whereby upon the application to the jaws of a force in a direction perpendicular to that of the mutual movement of the jaws the rolling bodies will cause relative motion of the two jaws and when the force is removed the resilience of the rubber causes the mutual return movement of the jaws.

3. A tool according to claim 2, in which each support member is in the form of a substantial rectangle with the shorter ends curved and in contact with the jaw and the carrying body.

4. A tool according to claim 2, in which each support member is in the form of a roller in contact with the jaw and the carrying body.

5. A tool according to claim 2, in which each support member is in the form of a ball in contact with the jaw and the carrying body.

References Cited in the file of this patent
UNITED STATES PATENTS

| | | |
|---|---|---|
| 2,010,996 | Junkers | Aug. 13, 1935 |
| 2,364,938 | Beard | Dec. 12, 1944 |
| 2,425,913 | Beard | Aug. 19, 1947 |
| 2,699,079 | Eckold | Jan. 11, 1955 |